Figure 1:
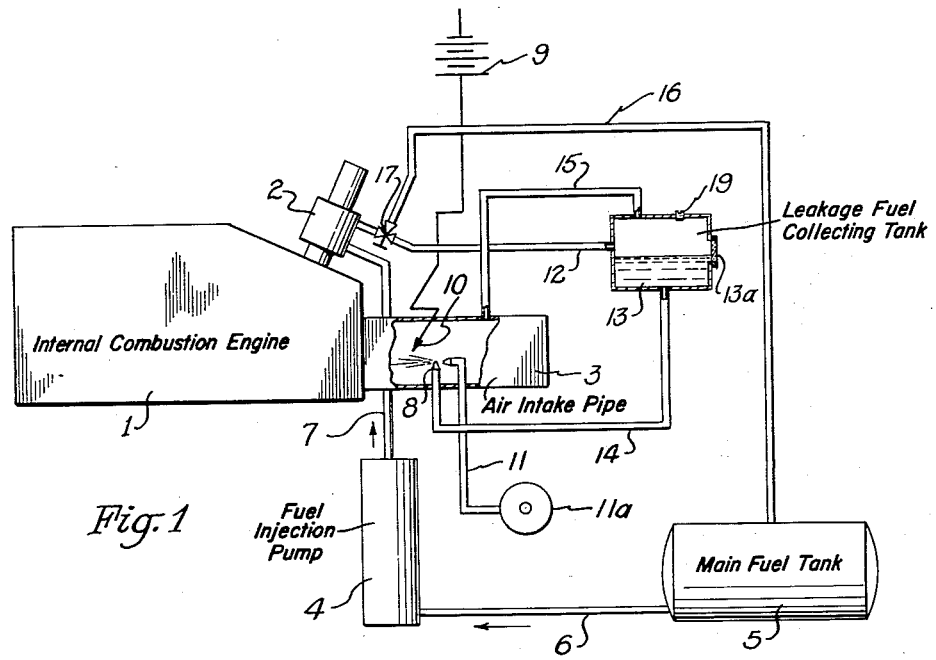

July 25, 1961 J. KONRAD ET AL 2,993,487
STARTING DEVICE FOR INTERNAL COMBUSTION ENGINE
Filed Feb. 1, 1960

INVENTORS
JAKOB KONRAD
HEINZ-JÜRGEN RAMUNDT
ADOLF BETZ

BY Bailey, Stephens & Huettig
ATTORNEYS

United States Patent Office 2,993,487
Patented July 25, 1961

2,993,487
STARTING DEVICE FOR INTERNAL COMBUSTION ENGINE
Jakob Konrad, Heinz Jürgen Ramündt, and Adolf Betz, Nurnberg, Germany, assignors to Maschinenfabrik Augsburg-Nurnberg, A.G., Nurnberg, Germany
Filed Feb. 1, 1960, Ser. No. 5,687
Claims priority, application Germany Feb. 4, 1959
5 Claims. (Cl. 123—142.5)

This invention relates to a starting device for an internal combustion engine. In particular, the invention is directed to a starting device for an internal combustion engine having a fuel injection nozzle.

According to the invention, an automatically operated cold starting device is provided for fuel injection engines, especially for multi-cylinder engines. This cold starting device is mounted on or in the air intake pipe of the engine and uses a liquid starting fuel. Thus the device can be used so that the intake air is heated indirectly, in which case the burner flame is directed against the wall of the intake pipe. The air being drawn through the intake pipe by the motor at the time of cold starting the motor flows through the intake pipe and is heated by contact with the hot wall of the pipe and also by heat radiated from the pipe wall. It is also possible to heat the intake air directly by placing the burner flame in the air flow so that the intake air is mixed with the hot combustion gases from the burner and thus heated. In both cases, an improvement in the starting performance of the engine is always obtained, especially when the ambient temperature is low.

It has been known to operate such cold starting devices by means of liquids, such as diesel oil, gasoline, or ether mixtures, which are pumped by means of a hand pump into a small supply tank prior to starting the engine. In other installations, such as vehicle engines, an electric pump powered from the vehicle battery is used to pump the starting fluid to the starting device. Each of these methods have the disadvantage in that either a hand pump or an electric motor are required, and these elements in of themselves require maintenance and are liable to malfunction.

The object of this invention is to produce a cold starting device for an engine which operates automatically and reliably without the need for a separate pump.

In general, this and other objects of the invention are obtained by utilizing the leakage fuel from the fuel injection nozzle or nozzles of the engine as the burning and heating fuel for the cold starting device. This leakage fuel is preferably collected in a small intermediate fuel tank, and although this leakage fuel is of a relatively small quantity, yet it is sufficient for the purpose of operating the cold starting device.

Fuel always leaks from fuel injection nozzles due to the high fuel injection pressures used. This leakage fuel ordinarily has not been collected for any specific purpose, but the leakage fuel was either circulated continuously into the intake air flow and combined with the air to be burned in the engine cylinder, or the leakage fuel was passed back to the main fuel supply tank for the engine. According to this invention, the leakage fuel is automatically and actually applied in a different and new manner to the fresh air intake system of the engine by being circulated from the injection nozzle to the burner nozzle for the cold starting device.

The intermediate leakage fuel collecting tank is here considered closed. When this tank becomes filled, the additional surplus leakage fuel is conveyed from the collecting tank to the intake system of the engine by means of a pipe terminating in the burner for the starting device or directly in the air intake pipe for the engine.

Again, the leakage fuel collecting means attached to the injection nozzle can be connected to the main engine fuel tank by means of a pipe containing a by-pass or changeover valve so that in the summertime the leakage fuel is returned to the main fuel tank and to the cold starting device during the cold months of the year.

The intermediate leakage fuel collecting tank can be very small as the connecting pipe lines also contain a definite supply of available leakage fuel. The advantage of the collecting tank lies in that at very low temperatures other cold starting liquids, as, for example, gasoline or ether mixtures, can be added to the collected leakage fuel so that the range of efficiency of the cold starting device is substantially increased. A closable cover is provided for said tank in order to introduce the additional cold starting liquids. The adding of these additional fuels has an especial advantage when the ambient temperatures are very low as an external ignition of the starting fuel in the air intake pipe can be omitted. It suffices that the cold starting fuel composed of leakage fuel and the added fuel functions only as a sprayer for introducing the fuel into the air intake stream for the engine inasmuch as ether mixtures self-ignite in the cylinder, even when the engine compression pressures are relatively low. As batteries are known to fail rapidly at low ambient temperatures, the power of the battery does not need to be used as an ignition means when the mixed fuels are used for starting, and this includes the performance of the self-starter motor for the engine.

In an improved form of the invention, an equalizing pipe is provided between the leakage fuel collecting tank and the air intake pipe for the engine. By so doing, the fuel level in the collecting tank can be maintained constant during the automatic drainage of the excess leakage fuel. In multiple cylinder engines, it is only necessary to use the leakage oil taken from a single fuel injection nozzle as it has been found that this gives sufficient fuel for operating the cold starting device.

Figure 2:
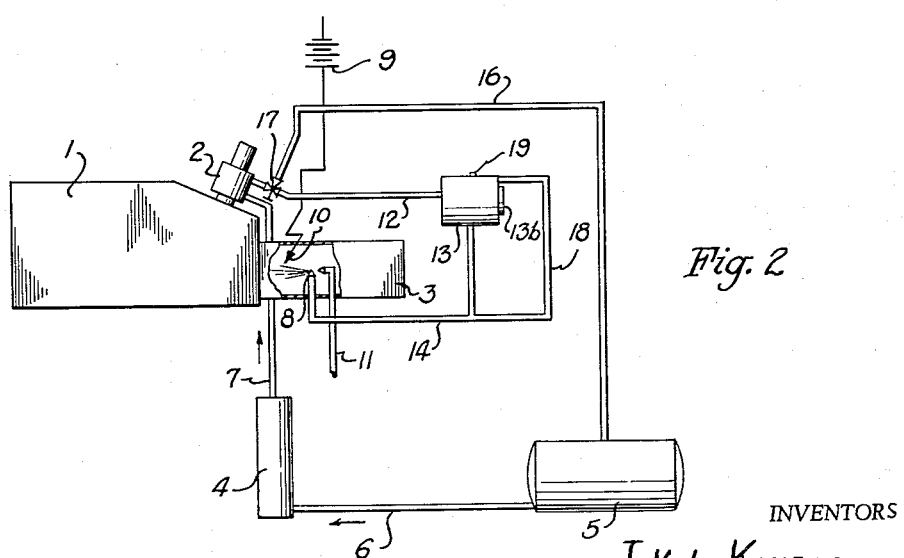

The means by which the objects of the invention are obtained are described more fully with reference to the accompanying drawings, in which:

FIGURE 1 is a schematic view of the cold starting device applied to an engine; and FIGURE 2 is a similar view of a modified form of the invention.

As shown in FIGURE 1, the engine cylinder head 1 contains a fuel injection nozzle 2 and a fresh combustion air intake pipe 3. A fuel injection pump 4 receives fuel from the main fuel tank 5 through pipe 6 and forces the fuel through pipe 7 under high pressure to nozzle 2. The cold starting device is mounted within the air intake pipe 3 and is composed of a burner nozzle 8. Fuel emitted from burner 8 is ignited by means of an electric current supplied from battery 9 to spark plug 10 mounted adjacent burner 8. A pipe 11 connected to a source 11a of compressed air is utilized to blow a spray jet of fuel from the tip of burner 8. The leakage fuel from injection nozzle 2 is conveyed through pipe 12 to a closed intermediate leakage fuel collecting tank 13 from which the leakage fuel is led through pipe 14 to nozzle 8, this being done automatically in view of the pressure on the fuel in injection nozzle 2. Ordinarily, tank 13 is kept closed, but is provided with an opening 19 closable by a plug and through which additional gasoline or ether mixtures can be introduced into the tank. A pipe 15 extends between the top of tank 13 and the air intake pipe 3 in order to equalize the pressure on the leakage fuel.

In operation, as the motor is turned over, the pressure on the leakage fuel in nozzle 2 causes the leakage fuel to flow out through burner 8. Compressed air from pipe 11 blows across the burner tip and forms a fuel spray which is ignited by spark plug 10 and thus forms a flame, the combustion gases of which heat the fresh intake air being drawn into the cylinder.

If an excess of leakage fuel is not to be fed to tank 13, it is passed from the leakage fuel collector pipe 12 through by-pass pipe 16 which extends from valve 17 to main fuel tank 5. Tank 13 is provided with a window 13a functioning as a sight gauge for determining the level of the fuel in the tank.

In FIGURE 2, a modification is shown in which the excess leakage fuel is led from leakage fuel collecting tank 13b through pipe 18 to burner 8. This is done when a pressure equalization pipe 15 is not used.

Having now described the means by which the objects of the invention are obtained, we claim:

1. A cold starting device comprising a fuel injection engine, a fuel injection nozzle mounted on said engine, an air intake pipe connected to said engine, tank means joined to said nozzle for collecting leakage fuel from said nozzle, and burner means joined to said tank collecting means for burning the collected leakage fuel for heating the intake air in said air intake pipe for said engine.

2. A cold starting device as in claim 1, further comprising a main fuel tank connected to said nozzle, a by-pass pipe extending between said tank means and said main fuel tank, and a by-pass valve in said by-pass pipe for selectively feeding at least a portion of said leakage fuel to said main fuel tank.

3. A cold starting device as in claim 2, said tank means comprising a closed storage tank, and an overflow pipe connected between said storage tank and said burner means for burning excess leakage fuel collected in said storage tank.

4. A cold starting device as in claim 1, said tank means comprising a storage tank, and a pressure equalizing pipe line extending between said storage tank and said air intake pipe.

5. A cold starting device as in claim 1, said tank means comprising a storage tank for holding leakage fuel coming from said nozzle, and opening means in said tank for introducing additional starting fuel into said tank.

References Cited in the file of this patent

UNITED STATES PATENTS

| | | |
|---|---|---|
| 1,596,194 | Lang | Aug. 17, 1926 |
| 1,991,587 | Vincent | Feb. 19, 1935 |
| 2,191,186 | Amery | Feb. 20, 1940 |
| 2,265,534 | Lloyd et al. | Dec. 9, 1941 |
| 2,716,972 | Farny et al. | Sept. 6, 1955 |

FOREIGN PATENTS

| | | |
|---|---|---|
| 801,774 | Great Britain | Sept. 24, 1958 |